United States Patent [19]

Lenney

[11] Patent Number: 4,507,429

[45] Date of Patent: Mar. 26, 1985

[54] PRESSURE SENSITIVE ADHESIVES WITH IMPROVED SHEAR RESISTANCE

[75] Inventor: William E. Lenney, Allentown, Pa.

[73] Assignee: Air Products and Chemicals, Inc., Allentown, Pa.

[21] Appl. No.: 570,126

[22] Filed: Jan. 12, 1984

[51] Int. Cl.³ ................... C08F 220/12; C08F 2/20
[52] U.S. Cl. ........................... 524/800; 526/200; 526/210; 524/377; 524/43
[58] Field of Search ........... 526/200, 210, 261, 325, 526/328.5, 329.5; 524/386, 388, 800, 43, 524, 377

[56] References Cited

U.S. PATENT DOCUMENTS

| | | |
|---|---|---|
| Re. 24,906 | 12/1960 | Ulrich et al. |
| 3,257,478 | 6/1966 | Jubilee et al. |
| 3,654,213 | 4/1972 | Christenson et al. |
| 3,697,618 | 10/1972 | Grunewalder et al. |
| 3,890,292 | 6/1975 | Bohme et al. |
| 3,971,766 | 7/1976 | Ono et al. ............................ 526/320 |
| 3,998,997 | 12/1976 | Mowdood et al. .................. 526/271 |
| 4,185,050 | 1/1980 | Lazear et al. ....................... 525/221 |
| 4,388,432 | 6/1983 | Eskay .................................. 524/388 |

*Primary Examiner*—Christopher A. Henderson
*Attorney, Agent, or Firm*—Michael Leach; E. E. Innis; James C. Simmons

[57] ABSTRACT

A pressure sensitive adhesive composition comprising a polymer of an acrylate ester and/or vinyl ester, an olefinically unsaturated carboxylic acid comonomer, and a polyolefinically unsaturated copolymerizable monomer for enhancing cohesive strength of the interpolymer, the polymer being formed by an aqueous emulsion polymerization process in the presence of a stabilizer system comprising a hydroxypropyl methyl cellulose and an ethoxylated acetylenic tertiary diol.

20 Claims, No Drawings

PRESSURE SENSITIVE ADHESIVES WITH IMPROVED SHEAR RESISTANCE

TECHNICAL FIELD

This invention relates to a pressure sensitive adhesive comprising a polymer system having good tack and peel strengths and enhanced shear strength.

BACKGROUND OF THE INVENTION

Aqueous or solvent based pressure sensitive adhesives are well-known and have found application in a variety of areas such as, for example, in the manufacture of tapes and labels. Good pressure sensitive adhesives have immediate adhesion to a surface which property is often referred to as "quick tack". They also require good resistance to failure when subjected to shearing forces after application. This property is referred to as "shear strength" or "shear resistance". They must also have excellent bond strength which is referred to as "peel". In the past commercial adhesives have generally comprised an acrylate ester or vinyl ester based polymer system with various amounts of other monomers, for example, polyfunctional adhesion promoting monomers, added to give desired properties.

Recent developments in the disposable diaper field have created a demand for pressure sensitive tapes, but many pressure sensitive adhesives are not suited for this use because the adhesives cannot tolerate the shear forces associated with that application. Although attempts have been made to enhance the shear strength of the polymer system, the quick tack and peel values of the resulting adhesion generally diminish with the increase in shear strength.

Another commercial area requiring exceptional pressure sensitive adhesives is the permanent label field. These labels must adhere well and retain their bond formation. High shear resistance is required since these labels quite often are exposed to high shear forces.

The following patents disclose a variety of pressure sensitive adhesives which are considered to be acrylic ester or vinyl ester based systems. Representative patents include:

U.S. Pat. No. 3,257,478 discloses pressure sensitive adhesives comprising vinyl acetate, octyl acrylate, ethyl acrylate and maleic anhydride. In addition, crosslinkable monomers such as N-methylolacrylamide are included.

U.S. Pat. No. 3,654,213 discloses a pressure sensitive adhesive comprising a polymer base of 2-ethylhexyl acrylate, vinyl acetate, acrylic acid and a mixed vinyl ester of an alkanoic acid containing 10-12 carbon atoms.

U.S. Pat. No. 3,697,618 discloses an acrylic pressure sensitive adhesive consisting of a vinyl ester of a saturated monocarboxylic acid, e.g. vinyl acetate, an alkyl acrylate, e.g. one having from 4-14 carbon atoms such as 2-ethylhexyl acrylate or dodecyl acrylate, and an alpha,beta-ethylenically unsaturated dicarboxylic acid with the vinyl acetate being present in a proportion of from 20-60 wt%, at least 35 wt% alkyl acrylate and from about 0.3 to 5 wt% acid.

U.S. Pat. No. 3,890,292 discloses a pressure sensitive adhesive comprising an alkyl acrylate, an alpha,beta-unsaturated carboxylic acid such as acrylic or methacrylic acid, a vinyl ester, e.g. vinyl acetate, and a plasticizer such as dibutyl phthalate. Emulsion polymerization techniques are employed.

U.S. Pat. No. 3,971,766 discloses a pressure sensitive adhesive containing a copolymer of an alkyl acrylate with 2-6 mole% acrylic or methacrylic acid and 0.002 to 0.05 mole% of a polyfunctional unsaturated monomer, e.g. diallyl phthalate or polyethylene glycol dimethacrylate for imparting internal cohesive strength.

U.S. Pat. No. 3,998,997 discloses pressure sensitive adhesives of interpolymers of acrylates and acrylic acid using a di-, tri-, or tetrafunctional vinyl crosslinking agent to enhance the cohesive strength of the polymer. The pressure sensitive adhesives are formed by emulsion polymerization with anionic, cationic, nonionic or amphoteric-type emulsifiers and surfactants suggested as being effective stabilizers for the polymerization medium.

U.S. Pat. No. 4,185,050 discloses a pressure sensitive adhesive comprising a terpolymer of an alkyl acrylate, a vinyl ester and an ethylenically unsaturated carboxylic acid. The pressure sensitive adhesive comprising a blend of a plurality of terpolymers formed from the above monomers with each terpolymer having a specific molecular weight range.

U.S. Pat. No. Re. 24,906 discloses an acrylic-based pressure sensitive adhesive formed by polymerizing a non-tertiary acrylate ester with a copolymerizable monomer having strongly polar groups such as acrylic or methacrylic acid. Typical esters employed are isoamyl acrylate, 2-ethylbutyl acrylate and 2-ethylhexyl acrylate. The polymers are produced by emulsion polymerization.

SUMMARY OF THE INVENTION

The invention relates to a means for enhancing the shear strength of a pressure sensitive adhesive copolymer. The invention provides a basic polymer system for pressure sensitive adhesives comprising an interpolymer of an alkyl acrylate or vinyl ester, or both, an olefinically unsaturated carboxylic acid comonomer, and a polyolefinically unsaturated copolymerizable monomer for enhancing cohesive strength of the interpolymer. The improvement in the polymer system resides in forming the polymer system by aqueous emulsion polymerization techniques and carrying out the emulsion polymerization in the presence of a stabilizer system comprising (a) a hydroxypropyl methyl cellulose and (b) an ethoxylated acetylenic glycol represented by the formula:

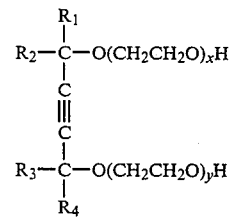

in which $R_1$ and $R_4$ are alkyl ($C_3$–$C_{10}$) radicals and $R_2$ and $R_3$ are methyl or ethyl, and x and y have a sum in the range of about 3, preferably 10, to 60, inclusive.

Pressure sensitive adhesive compositions containing copolymers produced using such stabilizer system demonstrate an unexpectedly improved shear strength without any substantial sacrifice in peel or quick tack strength associated with the adhesive.

As an additional advantage such pressure sensitive adhesives can be water based and designed for easy and efficient application.

DETAILED DESCRIPTION OF THE INVENTION

There are many properties necessary for the commercialization of a pressure sensitive adhesive, but qualities which all pressure sensitive adhesives require are high bond strength, which is determined at two intervals, mainly when first applied to a surface and after cure or bond formation, and high shear strength. The two properties of bond strength are referred to as "quick tack" and "peel" strength, both of which must be high, for example about 4 pounds per linear inch, in order to be effective as a pressure sensitive adhesive for tapes, particularly in the disposable diaper tape field and for permanent labels.

The third quality of a commercial adhesive is that it must have excellent cohesive strength such that when a shear force is applied, it will retain its integrity. Commercial pressure sensitive adhesives should have a shear resistance of above 3000 minutes, and preferably above 6000 minutes when measured with a 500 gram weight and 0.5 inch by 0.5 inch contact. Many of the conventional acrylate polymer systems contain soft polymer segments, and although these systems exhibit good quick tack and peel strength, they often have extremely poor shear strength. Vinyl acetate often has been incorporated into the polymer system to enhance the cohesive strength of the polymer, but still the shear strength of the polymer was too low for some applications. Crosslinking monomers, for example diallyl phthalate, were also added to aid shear resistance.

The present invention affords a pressure sensitive adhesive polymer system with the improvement relating to increasing the shear strength of the polymer system without substantially affecting the other properties, namely tack and peel. The polymer in the present system is formed by emulsion polymerization techniques and resides in the utilization of a stabilizer system comprising an ethoxylated acetylenic glycol and a hydroxypropyl methyl cellulose. It has been found that the ethoxylated acetylenic tertiary glycol when coupled with hydroxypropyl methyl cellulose substantially increases the shear strength of the resulting polymer as compared to the same polymer system prepared with conventional stabilizers including polyvinyl alcohol alone or in combination with nonionic surfactants or ethoxylated acetylenic glycols.

The first component of the stabilizer system used in the practice of the invention is a hydroxypropyl methyl cellulose. A suitable hydroxypropyl methyl cellulose is a water soluble protective colloid having 15–35% methoxyl substitution, 3–35% hydroxypropoxyl substitution and a viscosity ranging from 3 to 75,000 cps as a 2 wt% aqueous solution. It is preferred that the methoxyl substitution be about 28–30%, the hydroxypropoxyl substitution be 7–12% and the viscosity be in the range of 4 to 6 cps, especially about 5 cps. The degree of methoxyl and hydroxypropoxyl substitution is determined by the standard testing method ASTM D2363.

The other component of the stabilizer system is an ethylene oxide adduct of an acetylenic tertiary glycol structurally represented by the formula

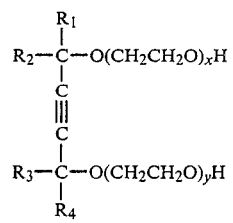

in which $R_1$ and $R_4$ are alkyl ($C_3$–$C_{10}$) radicals and $R_2$ and $R_3$ are methyl or ethyl, and x and y have a sum in the range of about 3–60, preferably 10–30, inclusive. In the preferred cases, $R_1$ and $R_4$ are alkyl ($C_3$–$C_4$) radicals and $R_2$ and $R_3$ are methyl groups. Further examples and synthesis techniques for the manufacture of these adducts are shown in U.S. Pat. Nos. 3,268,593 and 3,293,191 which are incorporated by reference. For purposes of the invention, contemplated as the functional or operative equivalent of an ethoxylated acetylenic diol are other alkoxylated acetylenic diols in which the alkoxy function may be propoxy, butoxy and the like or mixed alkoxy groups.

Ethoxylated tertiary acetylenic glycols for emulsion polymerization are generally used as a mixture or combination comprising a highly ethoxylated system (30 moles) and one of lesser ethoxylation, for example, 30 moles and 10 moles, respectively. Often, as is known, the lesser ethoxylated system will precipitate out at polymerization temperatures of about 70° C. and thus it is coupled with a higher ethoxylated form since that form is thermally stable at reaction temperature. However, as is known the higher ethoxylated form has lower wetability than the lesser ethoxylated form and, therefore, a balance between the tertiary acetylenic glycols is selected to accommodate the reaction medium.

In the polymerization process, the ethylene oxide adduct of the acetylenic tertiary glycol is included in a proportion sufficient to enhance the shear strength, or shear resistance, of the resulting copolymer. Typically, this proportion is from about 1 to 4 wt% of the monomers, and preferably is about 2 to 3 wt%. When the concentration of the ethoxylated acetylenic glycol falls below about 1 wt% there is generally insufficient surfactant to substantially increase the shear resistance. When the concentration exceeds about 4 wt%, no significant advantages are achieved or believed to be observed in terms of overall properties of the pressure sensitive adhesive. It may be that shear resistance increases, but there could also be a decrease in peel strength.

The hydroxypropyl methyl cellulose is included in the stabilizer system in a proportion of about 1 to 4 wt% of the monomers. With this protective colloid the polymerization tends to result in a polymer having higher insolubles than polymers produced without them. To produce the percent insoluble range desired in the adhesive, namely 45 to 65 wt% in toluene, the hydroxypropyl methyl cellulose is included in a proportion of about 1.5 to 3.5 wt% of the monomers with the ethoxylated acetylenic glycol comprising 1.5 to 3.5 wt% of the monomers.

The polymer in the pressure sensitive adhesive prepared according to the invention comprises any alkyl acrylate or vinyl ester monomer, or both, used in pressure sensitive adhesives. Types of alkyl acrylate esters commonly used are the $C_2$–$C_{10}$ alkyl esters of acrylic and methacrylic acid. The vinyl esters include the esters of $C_1$–$C_4$ alkanoic acids. Representative examples of alkyl esters of acrylic and methacrylic acid are butyl acrylate, amyl acrylate, hexyl acrylate, decyl acrylate, 2-ethylhexyl acrylate, butyl methacrylate, nonyl acrylate, and the like. Representative vinyl esters include vinyl propionate, vinyl butyrate and vinyl acetate which is the preferred vinyl ester.

Diesters can also be substituted for some or all of the alkyl acrylate esters in the practice of this invention. Thus, the diesters are the functional equivalent of the alkyl acrylates for purposes of this invention. These esters are generally $C_4$–$C_{14}$, preferably $C_8$–$C_{12}$, alkyl diesters of alpha,beta-olefinically unsaturated dicarboxylic acids. These diesters are included for purposes of imparting quick tack to the adhesive. Exemplary of these diesters are dihexyl maleate, dihexyl fumarate, dioctyl maleate, dibutyl maleate, dioctyl fumarate, and the like. Since these monomers are included in the copolymer for purposes of imparting quick tack, they can be used in addition to or as a replacement for the alkyl acrylate. Although vinyl acetate can be substituted for the alkyl acrylate or the olefinically unsaturated dicarboxylic acid diester, it is preferred that the pressure sensitive adhesive polymer contain a substantial amount of alkyl acrylate or diester of an unsaturated dicarboxylic acid, or both, in addition to the vinyl ester in order to provide the good quick tack and peel properties. Accordingly, either of these esters can be combined with vinyl acetate to produce a polymer having the desired Tg range and softness for quick tack and peel. Dioctyl maleate has been found to be a particularly effective diester for use with vinyl acetate in preparing the pressure sensitive adhesives according to the invention.

Combinations of monomers are selected so that the polymer will have a "softness" to it at room temperature, which is manifested in a polymer Tg (glass transition temperature) of $-10°$ C. or below. Typically, the Tg is about $-20°$ to $-45°$ C. in these polymer systems. Thus, when a hard polymer forming monomer is included in the system, it may be necessary to alter its effect somewhat by including a softer polymer forming monomer or to increase the amount of soft polymer forming monomer. For example, if a high proportion of vinyl acetate is used, which results in a tough polymer having reduced peel, it may be necessary to go to a higher molecular weight acrylate ester or diester in order to soften the polymer to the desired level.

The vinyl ester, alkyl acrylate ester and/or diester combination is incorporated into the polymer system in an amount from about 92 to about 99.4 wt% with the balance comprising other monomers including polyolefinically unsaturated and adhesion promoting monomers. In most cases the polymer will comprise from about 25 to 50 wt% vinyl acetate and from about 50 to 75 wt% alkyl acrylate or diester. Since high levels of vinyl acetate in the polymer reduce peel and quick tack, it is preferable to use less vinyl acetate and enhance the cohesive strength of the polymer through the addition of greater amounts of polyolefinically unsaturated copolymerizable monomer, hydroxypropyl methyl cellulose or ethoxylated acetylenic glycol, or all of these materials.

A polyfunctional monomer is incorporated into the polymer system to enhance the internal cohesive strength of the pressure sensitive adhesive. This type of monomer internally crosslinks the polymer system as it is formed as opposed to crosslinking the polymer system after synthesis, as in a post-cure system. The preferred polyfunctional monomers are polyolefinically unsaturated monomers such as polyvinyl or polyallylic monomers. These monomers can be di-, tri- or tetra olefinically unsaturated systems and include divinyl benzene, divinyl adipate, diallyl phthalate, diallyl maleate, diallyl fumarate, triallyl cyanurate and the like. These polyfunctional monomers are used in a small proportion, in general from about 0.1 to 0.4 wt% of the polymer system. When more than 0.4 wt% of the polyfunctional monomer is used, as for example with a triallylic monomer, the cohesive strength of the polymer may be increased but often the peel strength is reduced. Higher levels of monomer may be required with the di-olefinically unsaturated system than with the tri- or tetra-olefinically unsaturated system in order to achieve cohesive strength.

A fourth component used in the manufacture of the pressure sensitive adhesive is an adhesion promoting olefinically unsaturated carboxylic acid. The monocarboxylic acid monomers conventionally used in the manufacture of pressure sensitive adhesives and used in this invention contain from about 3 to 6 carbon atoms. Examples of such unsaturated carboxylic acids suited for the polymer system are those of the acrylic acid series such as acrylic and methacrylic acid, crotonic acid, maleic acid and the like. For reasons of convenience, acrylic acid is the preferred monomer. The acid functionality is included in an adhesion promoting amount from about 0.5 to 3 wt% of the polymer system. The combination of carboxyl containing monomer plus polyolefinically unsaturated monomer enhances shear resistance with the acid functionality having a tendency to enhance peel strength and quick tack in addition to enhancing sheer resistance.

Monomers in the four classes described above are well known as illustrated in the prior art describing polymer systems for pressure sensitive adhesive application. Accordingly, polymer based systems describe in the patents in the "Background of the Invention" section of this application are incorporated by reference.

The polymers which are best suited for pressure sensitive adhesive application using preferred monomers have an "insolubles" (measured in toluene at reflux temperature and atmospheric pressure) of about 45–65 wt%. The insolubles of the polymer can be controlled within this range by varying the ratio of polyolefinically unsaturated monomer vis-a-vis the unsaturated carboxylic acid and by controlling the level of stabilizer and the ratio of components in the stabilizer system. For example, employing a high level of hydroxypropyl methyl cellulose content or polyolefinically unsaturated monomer will tend to increase the insolubles content of the polymer as compared to polymers produced with a low level of these materials. Polymers having low insolubles, for example less than about 45 wt%, tend to have reduced shear strength.

A preferred polymer base for the pressure sensitive adhesive generally comprises by weight:
(a) 57–67% alpha,beta-olefinically unsaturated dicarboxylic acid diester, for example, dioctyl maleate,
(b) 32–42% vinyl acetate,
(c) 0.1 to 0.4% polyallylic monomer, particularly triallyl cyanurate, and
(d) 0.5 to 3% olefinically unsaturated carboxylic acid, for example acrylic acid.

The stabilizer system for preparing the aqueous emulsion reaction mixture comprises 1-4% wt% of an ethoxylated adduct of a tertiary acetylenic glycol and 1-4% wt% hydroxypropyl methyl cellulose, based upon the weight of the monomers.

The copolymers constituting the base of the aqueous pressure sensitive adhesive dispersions of this invention can be formed by conventional emulsion polymerization techniques. In this polymerization, a recipe is formed which generally consists of water, stabilizers, buffers, and monomers and then polymerized at conventional temperatures. Temperatures for the polymerization of esters of the type described range from about 20°-80° C. In view of the difference in the polymerization rate of many of the various monomers, it may be preferable to delay (continuously or intermittently add) the addition of those monomers having a fast polymerization rate into the polymerization medium. For example, the acrylic monomers have a reaction rate much faster than vinyl acetate and often are delayed to the system during polymerization.

The preferred procedure for providing pressure sensitive adhesive polymers having enhanced shear resistance is the polymerization method incorporating a "cold initiation". The first step, as with most other aqueous emulsion processes, lies in the formation of an aqueous emulsion of vinyl acetate and/or alkyl acrylate and other components used in the reaction mixture. In this regard, water is first mixed with a stabilizer system, preferably the stabilizer systems described above. Other components, for example, buffers, may be added as needed to form a premix. The premix is then charged to the reactor and the vinyl acetate and/or alkyl acrylate ester added. Optionally, these monomers can be added to the premix. At least 10 wt% and preferably about 50 wt% of the ester monomers are added prior to initiation. Then the oxidizing agent of the redox initiator system is added to the reactor.

Free radical sources, e.g. redox systems, used in the practice of this invention are conventional and used in conventional amounts. Examples of reducing agents include the sulfoxylates, bisulfites, and ferrous salts. Specific examples include sodium and zinc formaldehyde sulfoxylate. Oxidizing agents include hydrogen peroxide and t-butyl hydroperoxide.

Prior to initiation the reaction mixture is adjusted to a temperature of from about 10° to 40° C., preferably 25° to 35° C. After the reaction mixture is brought to this initial temperature, polymerization of the reaction mixture is commenced by the addition of the reducing component of the initiator. The reducing agent could be added to the premix and the oxidizing agent added to initiate the reaction. It is also possible that some other free radical generating source could simply be added to the reaction mixture. On initiation, the temperature of the reaction mixture begins to rise and on continued addition of reducing agent the temperature will increase rapidly. Reducing agent addition is adjusted to reach a reaction temperature of from about 45° to 85° C., typically 50° to 60° C., ideally about 55° C., within about 2 hours and preferably within 1 hour, and then it is added at a rate to maintain such a temperature. The reaction temperature is set to be at least 15° C., preferably at least 20° C., above the initiation temperature. The reactor is preferably initially purged of oxygen and then maintained under a nitrogen blanket at about atmospheric pressure.

Once the reaction temperature rises about one degree Centigrade upon initiation, the remaining ester monomers comprising vinyl ester, alkyl acrylate ester and/or diester, as well as the olefinically unsaturated carboxylic acid monomer and polyolefinically unsaturated monomer for enhancing adhesive strength are added in a delay mode, i.e. the continuous or intermittent addition at a substantially uniform rate over a period of time. Such a delay addition is desirable in view of the difference in polymerization rates of many of the various monomers as mentioned above. Typically, the addition of the monomers is carried out so that the major portion, for example, greater than 75% and preferably all the monomer is added by the time the ester monomer content in the emulsion is reduced to a level less than about 10 wt% and preferably less than 3 wt%, based on the emulsion.

Those skilled in the art will readily recognize that with a pressure sensitive adhesive copolymer comprising only acrylate esters, i.e. no vinyl ester, all the ester monomer, olefinically unsaturated carboxylic acid and polyolefinically unsaturated monomer could be added initially in a batch process utilizing the cold initiation procedure.

The pressure sensitive adhesive polymer emulsions prepared according to the invention are suitably used to prepare adhesive products by compounding with other well-known components in the art and can be applied by a variety of methods known to the art which, in general, involve coating and spraying. Specific examples of pressure sensitive adhesive products prepared by applying the emulsions of this invention to substrates include release liners, labels, decals and tapes.

The following examples are provided to illustrate embodiments of the invention and are not intended to restrict the scope thereof. All parts are listed as parts by weight, and all percentages are expressed as weight percentages unless indicated otherwise.

EXAMPLE 1

Runs 1-4 of this Example demonstrate the use of the typical polymerization process utilizing the reaction temperatures above about 50° C. commencing with initiation of the reduction, i.e. "hot initiation".

For Run 1 an aqueous pressure sensitive adhesive formulation was prepared by purging a one gallon stainless steel reactor with nitrogen. Then the reactor was initially charged with a mixture comprising:

| COMPONENT | WEIGHT PARTS |
| --- | --- |
| 1. 10% aqueous VINOL ® 205 PVOH[a] solution | 328.4 |
| 2. Deionized water | 700.0 |
| 3. Surfynol ® 485 Surfactant[b] | 15.9 |
| 4. Surfynol ® 465 Surfactant[c] | 33.3 |
| 5. 0.1% aqueous solution of $Fe_2(SO_4)_3 \cdot 7H_2O$ | 11.4 |
| 6. Vinyl acetate (VAc) | 303 |
| 7. Dioctyl maleate (DOM) | 518 |

[a]VINOL ® 205 is a partially hydrolyzed (87-89%) polyvinyl alcohol marketed by Air Products and Chemicals, Inc.
[b]Surfynol ® 485 is an ethylene oxide adduct of 2,4,7,9-tetramethyl decyne diol containing an average of 30 moles ethylene oxide per mole of surface active agent and having a cloud point of about 100° C. marketed by Air Products and Chemicals, Inc.
[c]Surfynol ® 465 is an ethylene oxide adduct of 2,4,7,9-tetramethyl decyne diol containing an average of 10 moles ethylene oxide per mole of surface active agent marketed by Air Products and Chemicals, Inc.

After the reactor was initially charged with components 1-7, the vessel was then sealed under a nitrogen atmosphere. The agitator, which was a turbine blade agitator, was set at a rotation rate of about 300 rpm. After a nitrogen purge 28.5 parts of a 10% solution of t-butyl hydroperoxide was pumped into the vessel. The agitator was increased to 800 rpm. The temperature was raised to 55° C. After the temperature had reached a steady state, a 4.4% aqueous solution of sodium formaldehyde sulfoxylate was introduced into the reactor at a rate of about 1.2 ml/min and polymerization was initiated at this time. Once the polymerization had been initiated, the rate of addition of sodium formaldehyde sulfoxylate was maintained at about 1.1 to 1.2 ml/min for a period of about 215 minutes. Upon initiation a delay feed monomer composition was introduced at a rate of about 7 ml/min. The delay feed monomer composition comprised 294.8 parts vinyl acetate, 509.8 parts dioctyl maleate, 16.4 parts acrylic acid and 4.10 parts triallyl cyanurate. The delay feed was about 880 ml and was added over a period of about 120 minutes. To maintain the reaction 115 ml of 10% t-butyl hydroperoxide catalyst were added over a period of 215 minutes.

The reaction proceeded in conventional emulsion polymerization manner with the process temperature being maintained at 55° C. by jacket temperature control. After about 3 hours, the reaction exotherm decreased indicating the polymerization was about complete at which time a small amount (4.8 ml) vinyl acetate was added over a 5 minute period. The purpose of this addition was to remove any residual dioctyl maleate in the system. Once the polymerization was complete, the contents of the vessel were cooled to 30° C. and removed from the reactor. The resulting product was then adjusted with a 14% aqueous ammonium hydroxide solution to raise the pH from a level of about 2.5–4.2 to a range between 5.5 and 6.5. The resulting polymer was measured for percent insolubles by measuring solubility in toluene at reflux temperature at atmospheric pressure. It had percent insoluble of 43%. The Tg was about $-23.5°$ C.

This procedure was repeated for Runs 2–4 with the only change being the substitution of the stabilization system as indicated in Table 1 for the polyvinyl alcohol ethoxylated acetylenic diol blend.

TABLE 1

| RUN | INI-TIA-TION | STABILIZATION SYSTEM | SHEAR RESIS-TANCE (hr) | 180° PEEL (lb) | LOOP TACK (lb) |
|---|---|---|---|---|---|
| 1 | Hot | PVOH/Surfynol blend | 44 | 5.5 | 4.5 |
| 2 | Hot | PVOH/Triton ® blend[a] | 9 | 4.6 | 2.8 |
| 3 | Hot | ME-5[b]/Surfynol blend | 124 | 3.9 | 4.3 |
| 4 | Hot | ME-5/Triton blend | 29 | 4.3 | 3.7 |
| 5 | Cold | PVOH/Surfynol blend | 232 | 5.0 | 4.1 |
| 6 | Cold | PVOH/Triton blend | 91 | 4.8 | 3.1 |
| 7 | Cold | ME-5/Surfynol blend | >270 | 4.2 | 3.5 |
| 8 | Cold | ME-5/Triton blend | 77 | 4.0 | 4.1 |

[a]A 2:1 equivalent basis blend of Triton X-100 and Triton X-305. Triton is an octylphenoxy polyethoxy ethanol marketed by Rohm and Haas.
[b]ME-5 is Methocel ® E-5, a hydroxypropyl methyl cellulose having a 28–30% methoxyl substitution and a 7–12% hydroxypropoxyl substitution marketed by Dow Chemical Co.

EXAMPLE 2

Polymerization Runs 5–8 were repeats of Runs 1–4, respectively, with the exception that the "cold initiation" process was used. A premix comprising components 1–7 as described was charged to the reactor. After charging the premix to the reactor and purging with nitrogen, the temperature of the premix was adjusted to a temperature of about 32° C. and mixed for 30 minutes. The polymerization was initiated by addition of the reducing agent. After the premix temperature rose about 1° C. indicating the beginning of the exotherm, the addition of the delay feeds was commenced. The rate of reducing agent addition caused the reaction temperature to reach about 52° C. within about 30 minutes and the temperature was maintained at about 55° C. by the control addition of the reducing agent.

From the data presented in Table 1 it can be seen that the utilization of the hydroxypropyl methyl cellulose-ethoxylated acetylenic glycol stabilizing system according to the invention resulted in a remarkable improvement in the shear resistance of the pressure sensitive adhesive polymer compositions of Runs 3 and 7 compared to their hot initiated and cold initiated counterparts using other stabilizer combinations.

The vinyl acetate/dioctyl maleate/acrylic acid/triallyl cyanurate (VAc/DOM/AA/TAC) polymer emulsions prepared using hydroxypropyl methyl cellulose and polyethoxylated acetylenic diol as the stabilization system provided the best shear resistance properties. The hot initiated Run 3 pressure sensitive adhesive composition demonstrated a 124 hour shear resistance which jumped up to a startling duration of greater than 270 hours when the cold initiation process was performed in Run 7. The peel strength improved by about 10% while the loop tack strength was reduced about 20% although still within an acceptable commercial range. For the other hot initiated and cold initiated emulsions the next best shear resistance of a relatively low 44 hr. and 232 hr., respectively, was provided by Runs 1 and 5 using polyvinyl alcohol and ethoxylated acetylenic glycol blend. The emulsions of Runs 4 and 8 using the hydroxylpropyl methyl cellulose-octylphenoxy polyethoxy ethanol system were far inferior in shear resistance to the stabilizer systems of the invention.

EXAMPLE 3

In polymerization Runs 9–15 the cold initiation procedure of Example 2 was followed using the same amounts of monomers in various stabilization systems as set forth in Table 2.

TABLE 2

| RUN | STABILIZATION SYSTEM | SHEAR RESIS-TANCE (hr) | 180° PEEL (lb) | LOOP TACK (lb) |
|---|---|---|---|---|
| 9 | HEC[a]/Surfynol | 56.4 | 3.5 | 1.9 |
| 10 | HPC[b]/Surfynol | 18.6 | 3.9 | 1.7 |
| 11 | Jaguar[c]/Surfynol | 7.0 | 6.0 | 4.9 |
| 12 | ME-5/Surfynol | >166 | 4.7 | 2.9 |
| 13 | VINOL ® 205 PVOH | 55.9 | 0.8 | 1.6 |
| 14 | VINOL 205/Aerosol A-102[d] | Uncoatable | | |
| 15 | Aerosol A-102[d]/Surfynol | 1.2 | 5.4 | 3.2 |

[a]HEC is hydroxyethylcellulose, Natrosol 2502R marketed by Hercules, Inc.
[b]HPC is hydroxypropylcellulose, Klucel E marketed by Hercules, Inc.
[c]Jaguar Gum A₂S a polysaccharide marketed by Stein-Hall & Co., Inc.
[d]Aerosol A-102 is a disodium ethoxylated alcohol half ester of sulfosuccinic acid marketed by American Cyanamid. Used in Runs 14 and 15 at 0.9% wt. % and 0.6 wt. %, respectively.

From Table 2 it can be seen that Run 12, which was a repeat of Run 7 and used the hydroxypropyl methyl cellulose/polyethoxylated acetylenic diols stabilization system, resulted in a pressure sensitive adhesive polymer composition having a shear resistance of greater than 166 hours. The shear strength test was terminated at that time. The peel and loop tack properties were slightly less than that for corresponding Run 7. Run 9 which used a hydroxyethyl cellulose/polyethoxylated acetylenic diol stabilization system showed a shear resistance of about 56 hours. While the shear resistance of the composition prepared using polysaccharide and polyethoxylated acetylenic diols (Run 11) gave a relatively poor shear resistance of about 7 hours, the peel and loop tack strengths were much above that of the other runs.

Polymers prepared using polyvinyl alcohol alone or in combination with Aerosol A-102 surfactant (Runs 13 and 15) showed about 56 and 1.2 hr. shear resistance, respectively. In Run 14 the resulting emulsion was uncoatable because particle agglomeration had taken place.

Thus the above examples demonstrate the unexpectedly superior shear strength of pressure sensitive adhesive copolymer systems prepared by emulsion polymerization using a combination of a hydroxypropyl methyl cellulose and an ethoxylated acetylenic glycol.

STATEMENT OF INDUSTRIAL APPLICATION

The polymerization process of this invention provides pressure sensitive adhesive polymer compositions demonstrating enhanced shear resistance and suitable as adhesive coatings for release liners, labels, decals and tapes.

I claim:

1. In a pressure sensitive adhesive composition containing a polymer which comprises an interpolymer of an alkyl acrylate or vinyl ester, or both, an olefinically unsaturated carboxylic acid comonomer, and a polyolefinically unsaturated copolymerizable monomer for enhancing cohesive strength of the interpolymer and having a Tg of $-10°$ C. or below, the interpolymer being formed by an aqueous emulsion polymerization process, the improvement which comprises effecting the aqueous emulsion polymerization of the interpolymer in the presence of a stabilizer system comprising (a) a hydroxypropyl methyl cellulose and (b) an ethoxylated acetylenic glycol of the formula:

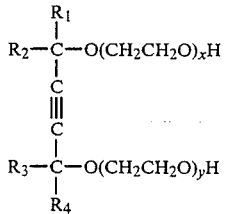

in which $R_1$ and $R_4$ are alkyl ($C_3$–$C_{10}$) radicals, $R_2$ and $R_3$ are methyl or ethyl, and x and y have a sum in the range of about 3 to 60, inclusive.

2. The pressure sensitive adhesive composition of claim 1 in which the interpolymer contains from about 92 to about 99.4 wt% acrylate ester and/or vinyl ester.

3. The pressure sensitive adhesive composition of claim 2 in which the interpolymer contains from about 25 to 50 wt% vinyl acetate and from about 50 to 75 wt% alkyl acrylate ester or alkyl diesters of alpha,beta-olefinically unsaturated dicarboxylic acids.

4. The pressure sensitive adhesive composition of claim 3 in which the polyolefinically unsaturated copolymerizable monomer is included in a proportion from about 0.1 to 0.4 wt%.

5. The pressure sensitive adhesive composition of claim 4 in which the polymerization is carried out in the presence of from about 1 to 4 wt% hydroxylpropyl methyl cellulose having 15-35% methoxyl substitution and 3-35% hydroxylpropoxyl substitution and from about 1 to 4 wt% of the ethoxylated acetylenic glycol, based on monomers, and the proportion of olefinically unsaturated carboxylic acid comonomer and the polyolefinically unsaturated copolymerizable monomer is controlled such that the percent insolubles of the resulting interpolymer is from 45-65 wt% in toluene at reflux temperature and atmospheric pressure.

6. The pressure sensitive adhesive of claim 5 in which the diester is an alkyl ($C_8$–$C_{12}$) diester of an alpha,beta-unsaturated dicarboxylic acid.

7. The pressure sensitive adhesive composition of claim 6 in which the olefinically unsaturated carboxylic acid is present in proportion from 0.5 to 3 wt% and the vinyl acetate is from 32-42 wt%.

8. The pressure sensitive adhesive composition of claim 7 in which $R_2$ and $R_3$ in the ethoxylated acetylenic glycol are methyl groups and the hydroxypropyl methyl cellulose contains 28-30% methoxy substitution and 7-12% hydroxypropoxyl substitution.

9. The pressure sensitive adhesive composition of claim 8 in which the hydroxypropyl methyl cellulose is present in an amount from 1.5 to 3.5 wt% and the ethoxylated acetylenic glycol is present in an amount from 1.5 to 3.5 wt%, based on monomers.

10. A pressure sensitive adhesive interpolymer comprising
(a) 57-67 wt% alpha,beta-olefinically unsaturated dicarboxylic acid diester,
(b) 32-42 wt% vinyl acetate,
(c) 0.1 to 0.4 wt% polyallylic monomer, and
(d) 0.5 to 3 wt% olefinically unsaturated carboxylic acid, the polymer being formed from an aqueous polymerization recipe comprising a hydroxypropyl methyl cellulose, an ethoxylated acetylenic glycol of the formula:

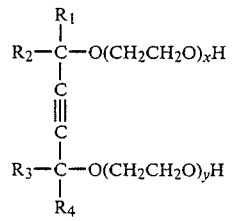

in which $R_1$ and $R_4$ are alkyl ($C_3$–$C_{10}$) radicals and $R_2$ and $R_3$ are methyl or ethyl and x and y have a sum in the range of about 3 to 60, inclusive, and a catalyst, at a temperature sufficient to effect polymerization of the monomers, the interpolymer having from 45-65 wt% insolubles in toluene at reflux temperature and atmospheric pressure.

11. The pressure sensitive adhesive interpolymer of claim 10 in which the diester is dioctyl maleate.

12. The pressure sensitive adhesive interpolymer of claim 11 in which the polyallylic monomer is triallyl cyanurate.

13. The pressure sensitive adhesive interpolymer of claim 12 in which the olefinically unsaturated carboxylic acid is acrylic acid.

14. The pressure sensitive adhesive interpolymer of claim 10 in which the proportion of hydroxypropyl methyl cellulose is from 1.5–3.5 wt% and the ethoxylated acetylenic glycol is from 1.5–3.5 wt%, based on monomers.

15. The pressure sensitive adhesive interpolymer of claim 14 in which the ethoxylated acetylenic glycol is a mixture comprising an ethoxylated acetylenic glycol in which the sum of $x+y$ is about 30 and an ethoxylated acetylenic glycol in which the sum of $x+y$ is about 10.

16. The pressure sensitive adhesive interpolymer of claim 15 in which the hydroxypropyl methyl cellulose has a viscosity in the range of 4 to 6 cps as a 2 wt% aqueous solution.

17. A pressure sensitive adhesive polymer emulsion comprising an interpolymer colloidally dispersed in water, the interpolymer comprising
(a) ester monomer which is an alkyl acrylate, an alkyl diester of an alpha,beta-olefinically unsaturated dicarboxylic acid or a vinyl ester,
(b) olefinically unsaturated carboxylic acid comonomer,
(c) polyolefinically unsaturated copolymerizable monomer for enhancing cohesive strength of the interpolymer, the combination of monomers selected to yield an interpolymer having a $T_g$ of $-10°$ C. or below, the interpolymer being formed by aqueous emulsion polymerization in the presence of a stabilizer system comprising
(d) a hydroxypropyl methyl cellulose and
(e) an ethoxylated acetylenic diol of the formula:

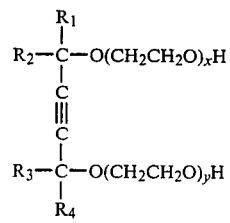

in which $R_1$ and $R_4$ are alkyl ($C_3$–$C_{10}$) radicals, $R_2$ and $R_3$ are methyl or ethyl, and x and y have a sum in the range of about 3 to 60, inclusive.

18. The pressure sensitive adhesive polymer emulsion of claim 17 in which the interpolymer has a $T_g$ of $-20°$ to $-45°$ C.

19. The pressure sensitive adhesive polymer emulsion of claim 17 in which the proportion of hydroxypropyl methyl cellulose is from 1 to 4 wt% and the ethoxylated acetylenic diol is from 1 to 4 wt%, based on monomers.

20. The pressure sensitive adhesive polymer emulsion of claim 19 in which the ethoxylated acetylenic diol is a mixture comprising an ethoxylated acetylenic diol in which the sum of $x+y$ is about 30 and an ethoxylated acetylenic diol in which the sum of $x+y$ is about 10.

* * * * *